(12) United States Patent
Nagahama (10) Patent No.: US 7,126,650 B2
(45) Date of Patent: Oct. 24, 2006

(54) ILLUMINATION UNIT AND LIQUID CRYSTAL DISPLAY APPARATUS COMPRISING SAME

(75) Inventor: Hiroshi Nagahama, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 16 days.

(21) Appl. No.: 10/501,192

(22) PCT Filed: Mar. 31, 2003

(86) PCT No.: PCT/JP03/04067

§ 371 (c)(1), (2), (4) Date: Jul. 9, 2004

(87) PCT Pub. No.: WO03/083362

PCT Pub. Date: Oct. 9, 2003

(65) Prior Publication Data

US 2005/0030443 A1    Feb. 10, 2005

(30) Foreign Application Priority Data

Mar. 29, 2002   (JP)   ............................. 2002-096528

(51) Int. Cl.
*G02F 1/1333* (2006.01)
*G02F 1/1335* (2006.01)

(52) U.S. Cl. .......................................... 349/58; 349/65

(58) Field of Classification Search ................. 349/65, 349/58
See application file for complete search history.

(56) References Cited

U.S. PATENT DOCUMENTS 5,399,518 A    3/1995    Sim et al.
5,652,165 A    7/1997    Lu et al.
5,838,400 A *  11/1998   Ueda et al. .................... 349/58
5,858,834 A    1/1999    Hirota et al.
5,916,694 A    6/1999    Tokura
5,936,272 A    8/1999    Lee (Continued)

FOREIGN PATENT DOCUMENTS

JP    61-081657    4/1986

(Continued)

*Primary Examiner*—James A. Dudek
(74) *Attorney, Agent, or Firm*—McDermott Will & Emery LLP (57) ABSTRACT

A liquid crystal display device comprising a lighting unit of the present invention is aimed to inhibit a liquid crystal panel 111 from breaking by a pressure from a display surface side of a liquid crystal cell 111, and to inhibit entry of dust having influence on display. Such lighting unit is structured in a way that a fluorescent discharge tube 2 is disposed close to an incident side end face E1 of a light guiding plate 1, and the end face E1 of the light guiding plate 1 and the fluorescent discharge tube 2, an end face E2 and a bottom surface of the light guiding plate 1 are covered with a reflecting sheet 3. A light correction sheet 4 is disposed on an emanating surface of the light guiding plate 1, and these components are stored in an electrically conductive casing 9. A spacing H of a space between the light correction sheet 4 and the light guiding plate 1 is set to not larger than one pixel dimension of the liquid crystal cell 111. The casing 9 has an opening portion J on a light emanating surface side, and a display rear surface side polarizer 13a of a liquid crystal panel 11 is disposed in direct contact with a front surface of the light correction sheet 4 within the opening portion J.

13 Claims, 5 Drawing Sheets

U.S. PATENT DOCUMENTS

| | | | |
|---|---|---|---|
| 5,953,608 A | 9/1999 | Hirota | |
| 6,016,175 A * | 1/2000 | Kim | 349/58 |
| 6,093,943 A | 7/2000 | Ikemasu et al. | |
| 6,166,788 A * | 12/2000 | Ha et al. | 349/58 |
| 6,177,971 B1 * | 1/2001 | Jung et al. | 349/60 |
| 6,515,721 B1 * | 2/2003 | Jin et al. | 349/58 |
| 6,549,263 B1 * | 4/2003 | Kim | 349/58 |
| 6,583,831 B1 * | 6/2003 | Kim | 349/58 |
| 6,600,526 B1 * | 7/2003 | Yano | 349/65 |
| 6,667,780 B1 * | 12/2003 | Cho | 349/58 |
| 6,690,435 B1 * | 2/2004 | Ha et al. | 349/61 |
| 6,741,298 B1 * | 5/2004 | Won | 349/58 |
| 2003/0156233 A1 * | 8/2003 | Ohsumi | 349/65 |

FOREIGN PATENT DOCUMENTS

| | | |
|---|---|---|
| JP | 63-126251 | 5/1986 |
| JP | 3-220725 | 9/1991 |
| JP | 5-102418 | 4/1993 |
| JP | 5-160276 | 6/1993 |
| JP | 6-021393 | 1/1994 |
| JP | 6-188239 | 7/1994 |
| JP | 8-204147 | 8/1996 |
| JP | 10-223897 | 8/1998 |
| JP | 11-074480 | 3/1999 |
| JP | 11-142841 | 5/1999 |
| JP | 11-195713 | 7/1999 |
| JP | P2001-216827 | 8/2001 |
| JP | P2001-356334 | 12/2001 |

* cited by examiner

ILLUMINATION UNIT AND LIQUID CRYSTAL DISPLAY APPARATUS COMPRISING SAME

TECHNICAL FIELD

The present invention relates both to a lighting unit and to a liquid crystal display device using the same.

BACKGROUND ART

Recently, a liquid crystal display device has been widely used as a display device of an information device such as a notebook-type personal computer, a word processor and the like, or as a display device of a video device such as a portable television, a video movie, a car navigation system and the like, by taking advantage of a characteristic in which the liquid crystal device is light and thin, and consumes small electricity. Such liquid crystal display device typically has a structure in which a liquid crystal panel is illuminated from behind by a built-in lighting unit for obtaining a bright display screen. The liquid crystal panel comprises at least a liquid crystal cell comprising a pair of transparent substrates such as glass substrates, with a liquid crystal layer interposed therebetween, and a pair of polarizers provided so as to retain the liquid crystal cell between them. As a structure of such a lighting unit, there is an edge light type in which a light guiding plate is disposed on a rear surface of the liquid crystal panel, and a linear light source such as a fluorescent discharge tube is disposed on an end face of the light guiding plate, for example. The edge light type excels in achieving a thin liquid crystal display device and a light emitting surface thereof with a uniform luminance. So, this is commonly adopted as a backlight type of the liquid crystal display device used in the notebook-type personal computer or the like. In the liquid crystal display device used in the portable television, the car navigation system and the like, the edge light type using two or more fluorescent discharge tubes, or the edge light type using an L-shaped or a U-shaped fluorescent discharge tube is commonly adopted, for obtaining a thin and luminous liquid crystal display.

In the edge light type in which the fluorescent discharge tube is disposed on the end face of the light guiding plate, it is important to reduce the size of the liquid crystal display device by storing components such as the light guiding plate, the fluorescent discharge tube, a lead wire or the like within a casing, for improving a characteristic of the liquid crystal display device such as portability and compactness.

Today, the liquid crystal display device is used in all household appliances in addition to the above-described uses. For example, the liquid crystal display device is commonly used in products used in severe surroundings, such as outside, owing to a portability thereof. Therefore, it becomes more important to consider about a warranty for a function of such products.

Figure 4:
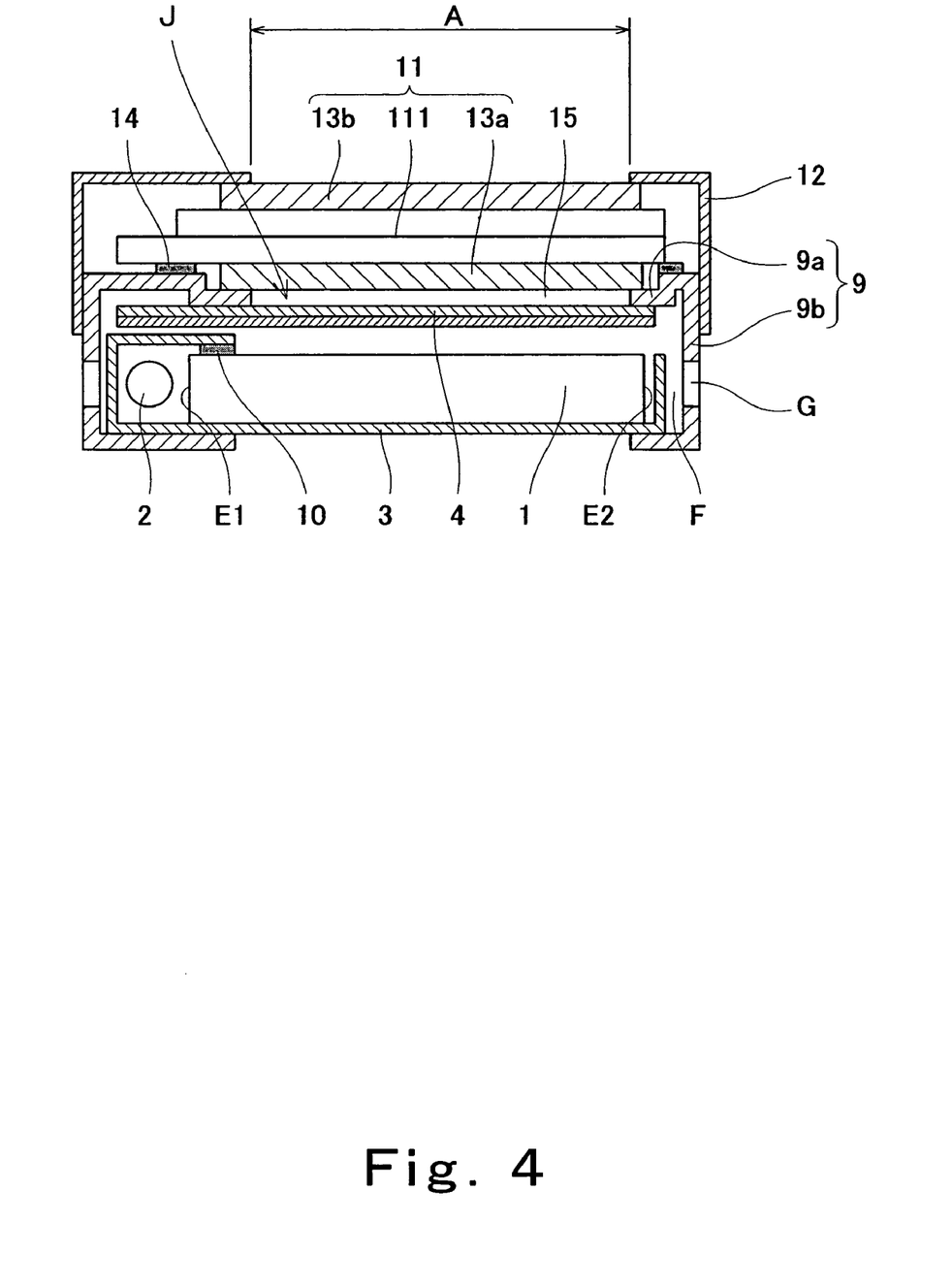
FIG. 4 is a cross-sectional view schematically showing a structure of a lighting unit and a liquid crystal display device comprising the same according to a prior art.
Figure 5A:
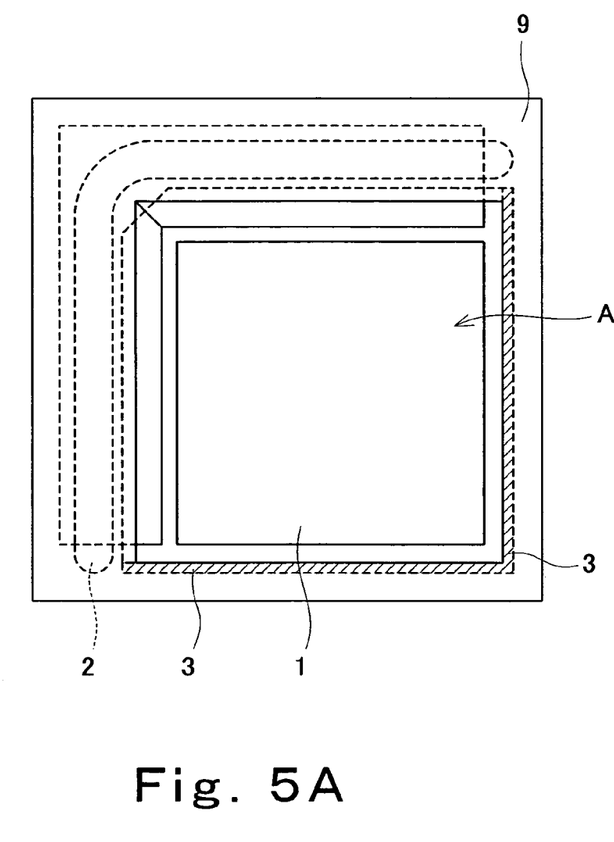
FIGS. 5(a) and 5(b) are views schematically showing the structure of the lighting unit in FIG. 4, wherein 5(a) is a perspective plan view and 5(b) is a side view.
Figure 5B:
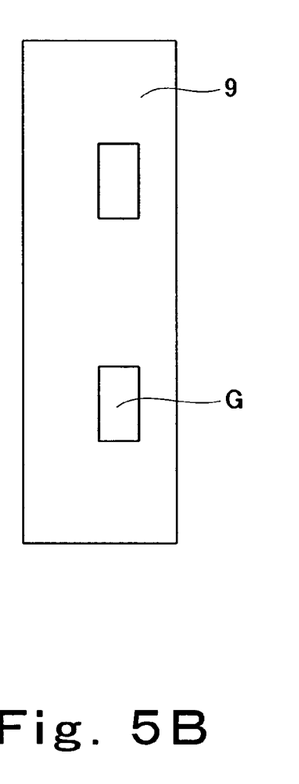

FIG. 4 is a cross-sectional view schematically showing a structure of the lighting unit of a conventional edge light type, comprising the fluorescent discharge tube, and of the liquid crystal display device comprising the lighting unit. FIGS. 5(a) and 5(b) are views schematically showing a structure of the lighting unit in FIG. 4, wherein FIG. 5(a) is a plan view and FIG. 5(b) is a side view. As shown in FIGS. 4, 5(a), and 5(b), the lighting unit comprises a flat-plate shaped transparent light guiding plate 1, configured to transmit light, an L-shaped fluorescent discharge tube 2 provided close to two of four sides of the light guiding plate 1, a reflecting sheet 3 for inhibiting light emitted from the fluorescent discharge tube 2 from emanating out of the light guiding plate 1, a casing 9 for holding these components, and a light correction sheet 4 provided on a light emanating surface side of the light guiding plate 1, The reflecting sheet 3 is bent so as to enclose the fluorescent discharge tube 2 disposed on an end face E1 of the light guiding plate 1, and an end portion of the reflecting sheet 3 is bonded to the light emanating surface of the light guiding plate 1 by a double face adhesive tape 10. Thereby, the light emitted from the fluorescent discharge tube 2 is guided into the light guiding plate 1 from the end face E1 of the light guiding plate 1 without leakage. The reflecting sheet 3 is also disposed on a rear surface (an opposite surface of the light emanating surface) of the light guiding plate 1, for reflecting the light emanating from the rear surface of the light guiding plate 1, and for returning the light into the light guiding plate 1. Furthermore, the reflecting sheet 3 is bent along an end face E2 of the light guiding plate 1 so as to cover the end face E2, on which the fluorescent discharge tube 2 is not provided. Thus structured, the light emanating from the end face E2 of the light guiding plate 1 is reflected by the reflecting sheet 3 and is returned into the light guiding plate 1. By thus returning the light emanating from the light guiding plate 1 into the same by the reflecting sheet 3, the light (i.e., an illumination light) emanating from the light emanating surface of the light guiding plate 1 is increased, thereby enabling the light to be used more efficiently.

As the reflecting sheet 3, a white resinous film having a high reflectivity is used, for example. The reflecting sheet 3 may be structured by using separate sheets disposed so as to correspond to a periphery of the fluorescent discharge tube 2, the rear surface of the light guiding plate 1, and the end face E2 of the light guiding plate 1. In this case, an integral-type sheet that continuously covers these portions is used. By using the integral-type reflecting sheet 3, a thin lighting unit, a cost reduction thereof, and a reduction of the number of assembly processes thereof are realized.

The light correction sheet 4 is disposed on the light emanating surface of the light guiding plate 1, for obtaining a uniform and highly luminous illumination light. The light correction sheet 4 comprises a plurality of optical sheets of various specifications as necessary. Herein, two light correction sheets 4 are provided, as shown in FIG. 4.

The light guiding plate 1 and the fluorescent discharge tube 2, which are covered with the reflecting sheet 3, and the light correction sheet 4, are held by the casing 9. The lighting unit is formed by these components thus stored in the casing 9. The casing 9 is frame-shaped so as to have an opening portion J and comprises an edge portion 9a and a side portion 9b. By forming the opening portion J, a display region A of a liquid crystal panel 11 to be described below is located within the opening portion J, and the edge portion 9a of the casing 9 encloses the display region A, in a plan view. A through-hole G which communicates with outside is provided on the side portion 9b of the casing 9, for a weight saving and an installation by a user. Furthermore, the light correction sheet 4 and the light guiding plate 1 are disposed so as to form a space (hereinafter, referred to as a clearance F) between them and an inner wall of the casing 9. By forming the clearance F, it becomes possible to absorb a dimension difference by the clearance F, when the light correction sheet 4, the light guiding plate 1, and the casing 9 expand with different expansion rates due to a temperature variation, thereby resulting in the dimension difference. Therefore, it becomes possible to inhibit occurrence of distortion or the like due to the dimension difference.

Furthermore, on the edge portion 9a of the casing 9 of the lighting unit, a liquid crystal panel 11 comprising a display rear surface side polarizer 13a, a display front surface side polarizer 13b, and a liquid crystal cell 111 comprising at least a pair of transparent substrates which retain a liquid crystal layer between them is provided. The liquid crystal panel 11 is fixed to the edge portion 9a of the casing 9 by a double face adhesive tape 14. And, a front cover 12 is provided so as to cover these components. A liquid crystal display device is obtained by thus disposing the liquid crystal panel 11 on the light emanating surface side of the lighting unit.

Since the display rear surface side polarizer 13a is disposed on the casing 9, as described above, a space 15 is formed between a bottom surface of the polarizer 13a and the light emanating surface of the lighting unit (an upper surface of the light correction sheet 4, to be more precise). Therefore, there is a problem that, the liquid crystal cell 111 deflects as much as the space 15 when a user accidentally pushes the display surface of the liquid crystal display device, so that the liquid crystal cell 111 comprising the glass substrates or the like is broken.

On the other hand, as described above, since the casing 9 has the through-hole G, dust might enter the casing (i. e., the lighting unit) from outside through the through-hole G. The entering dust might also enter the display region such as a vicinity of the light correction sheet 4 and the light guiding plate 1 through the clearance F. In the lighting unit and the liquid crystal display device thus structured, an outer size thereof is limited for obtaining a compact device, and thus it is often impossible to provide a component for inhibiting entry of the dust. Therefore, the dust entering from outside as described above, or being generated inside when assembling the device passes through the clearance F and enters a space between the light guiding plate 1 and the light correction sheet 4, or between the light correction sheet 4 or the like and the liquid crystal panel 11. The dust entering the space interrupts an output light when displaying an image, thereby causing non-uniform luminance to occur, or conceals pixels, thereby causing display defects. Also, there is a possibility that a component of the display region side such as the light correction sheet 4 is damaged by a friction between components and the dust. Once the dust enters a space between the liquid crystal panel 11 and the lighting unit, it is very difficult to clear the dust away without disassembling the device. Therefore, it is very important to inhibit the dust from entering the display region.

DISCLOSURE OF THE INVENTION

A first object of the present invention is to provide a lighting unit capable of inhibiting damage to a liquid crystal cell by a pressure from a display surface side of a panel, and a liquid crystal display device comprising the same. A second object thereof is to provide a liquid crystal display device comprising a lighting unit capable of inhibiting dust from entering a display region.

In order to achieve the above objects, according to the present invention, there is provided a lighting unit comprising a light source, a light guiding component for guiding light emitted from the light source and emanating the light from a light emanating surface to an object to be illuminated, a reflecting component covering at least a bottom surface of the light guiding component, a light correction component disposed on the light emanating surface of the light guiding component, and a casing for holding the light source, the light guiding component covered with the reflecting component, and the light correction component, wherein the casing has an opening portion in a region corresponding to a light emanating region of the light correction component, and the object to be illuminated is disposed in direct contact with an upper surface of the light correction component within the opening portion.

In such a configuration, since the object to be illuminated by the lighting unit is attached to the lighting unit in direct contact with a front surface of the light correction component within the opening portion formed in the casing, little space is formed between the light correction component and the object to be illuminated. So, when a pressure is applied from a principal surface side of the object to be illuminated, a large part of the front surface of the light correction component contacts the object so as to support this, so that it becomes possible to inhibit occurrence of deformation such as deflection or the like in the object. Therefore, it is possible to inhibit damage to the object to be illuminated.

The liquid crystal display device according to the present invention comprises the lighting unit according to the above-described present invention, and a liquid crystal panel as the object to be illuminated disposed on the light emanating surface side of the lighting unit, the liquid crystal panel having the liquid crystal cell comprising a pair of transparent substrates with a liquid crystal layer interposed therebetween, wherein the liquid crystal panel is disposed in direct contact with the front surface of the light correction component within the opening portion of the casing of the lighting unit.

In such a configuration, since the liquid crystal panel as the object to be illuminated is disposed in direct contact with the light correction component within the opening portion of the casing of the lighting unit, little space is formed between a rear surface of the liquid crystal panel (i. e., an opposite surface of the display surface) and the light correction component. So, when a pressure is applied from the display surface side to the device, the liquid crystal cell composing the liquid crystal panel is supported by the light correction component, and hence by a large part of an upper surface of the light guiding component. Therefore, it becomes possible to inhibit occurrence of deformation such as deflection or the like in the liquid crystal cell. As a result, it is possible to inhibit damage to the liquid crystal cell, such as break.

The liquid crystal panel may comprise a pair of polarizers with the liquid crystal cell interposed therebetween, and a lighting unit side polarizer of the pair of polarizers may have an outer diameter smaller than that of the opening portion of the casing, and may directly contact the front surface of the light correction component within the opening portion.

In such a configuration, since the outer diameter of the opening portion of the casing is larger than that of the polarizer on the lighting unit side, it becomes possible to dispose the polarizer within the opening portion and to allow the polarizer to directly contact the light correction component.

The casing may have a frame-shaped edge portion protruding toward the opening portion so as to enclose the opening portion, and the liquid crystal cell may be disposed on an upper surface of the edge portion thereof.

In such a configuration, the edge portion of the casing can hold the light guiding component, the light correction component and the like from above (a light emanating side). Also, positioning of the liquid crystal cell becomes easier, and the liquid crystal cell can be fixed to the edge portion of the casing by using an adhesive tape or the like.

A thickness of the edge portion of the casing may be substantially equal to that of the polarizer on the lighting unit side.

In such a configuration, since the edge portion of the casing and the polarizer have substantially the same thickness, an upper surface of the edge portion and an upper surface of the polarizer are substantially coplanar with each other. With the liquid crystal cell disposed on these flat upper surfaces of the edge portion and of the polarizer, since these flat surfaces contact the liquid crystal cell so as to substantially uniformly support the cell, it is possible to inhibit damage to the liquid crystal cell.

The casing may be made of an electrically conductive material.

In such a configuration, by the casing, it becomes possible to inhibit a noise from entering an electronic component of the liquid crystal display device by influence of an electromagnetic wave or the like generated from the light source.

In the lighting unit, a spacing of a space formed between the light guiding component and the light correction component is preferably not larger than a dimension of each of pixels composing the liquid crystal panel. For example, this is preferably 0.4 mm or smaller.

In such a configuration, a structure in which only dust not larger than one pixel dimension might enter the space between the light guiding component and the light correction component is realized. Since such small dust does not have large influence on a display image and a luminance, good display can be obtained.

The casing may have a through-hole to allow an outside of the casing and an inside of the casing to communicate with each other.

In such a configuration, the through-hole makes it possible to achieve a thin device and to facilitate an installation thereof by a user. Also, in this configuration provided with the through-hole, the dust enters inside of the lighting unit from outside through the through-hole, but since the structure in which only the dust not larger than one pixel dimension might enter the display region is realized as described above, it is possible to realize the above-described effect while inhibiting influence of the entered dust on the display image and the luminance.

The light guiding component may be a light guiding plate, the light source may be disposed along a first end face of the light guiding plate, the reflecting component may be a reflecting sheet, a bottom surface of the light guiding plate, the first end face of the light guiding plate and the light source, and a second end face of the light guiding plate on which the light source is not disposed may be covered with the reflecting sheet, the light correction component may be a light correction sheet, and the casing may be frame-shaped and may support at least the bottom surface of the light guiding plate, the second end face of the light guiding plate, and the first end face of the light guiding plate and the light source, each of which is covered with the reflecting sheet.

In such a configuration, it is possible to realize the liquid crystal display device comprising the lighting unit of an edge light type, and to obtain a thin and light device.

The object, as well as other objects, features and advantages of the present invention will become more apparent from the following detailed description of the preferred embodiments taken with reference to the accompanying drawings.

BEST MODE FOR CARRYING OUT THE INVENTION

Hereinafter, embodiments of the present invention will be described with reference to the drawings.

Figure 1:
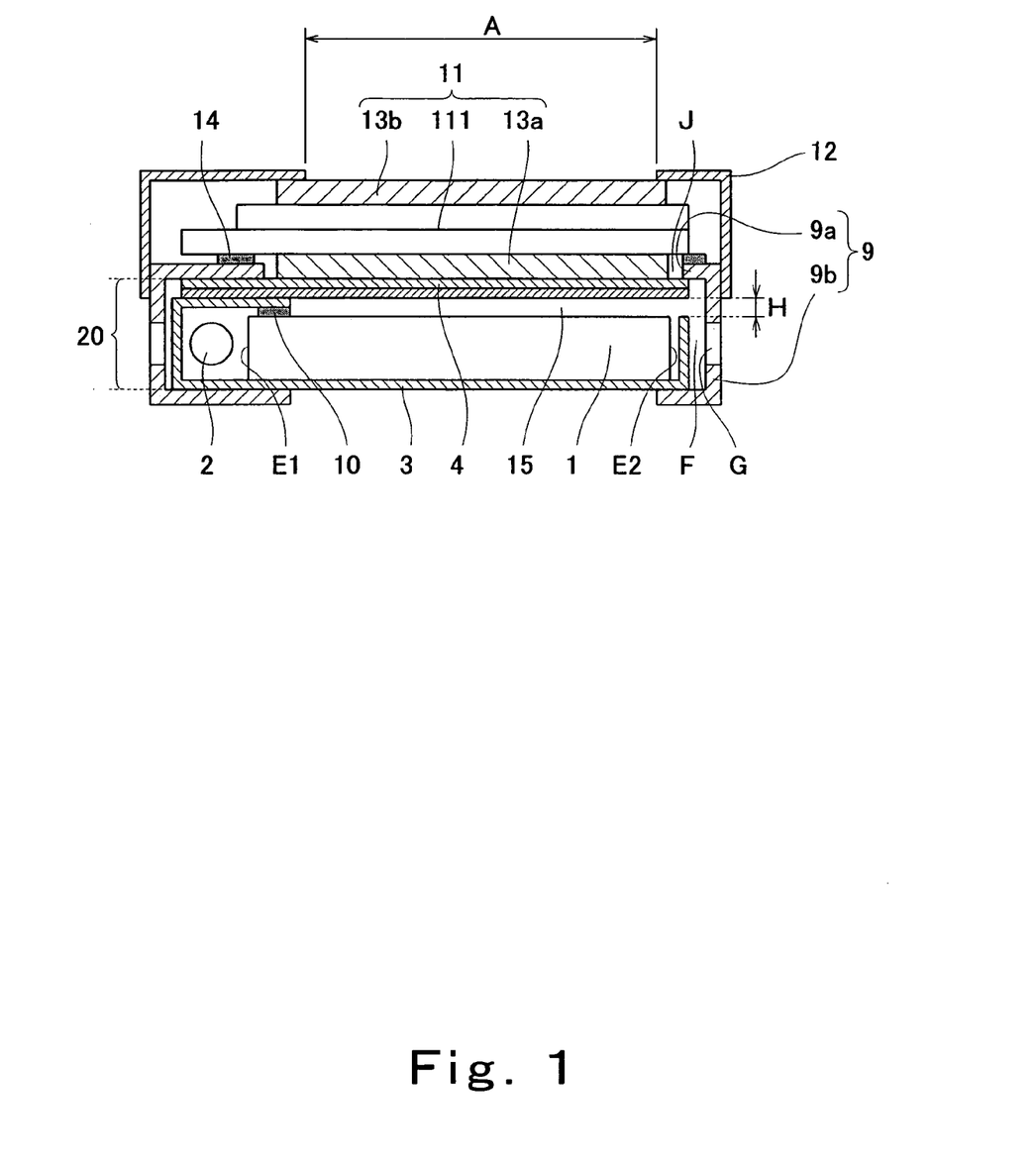
FIG. 1 is a cross-sectional view schematically showing a structure of a lighting unit and a liquid crystal display device comprising the same according to an embodiment of the present invention.
Figure 2:
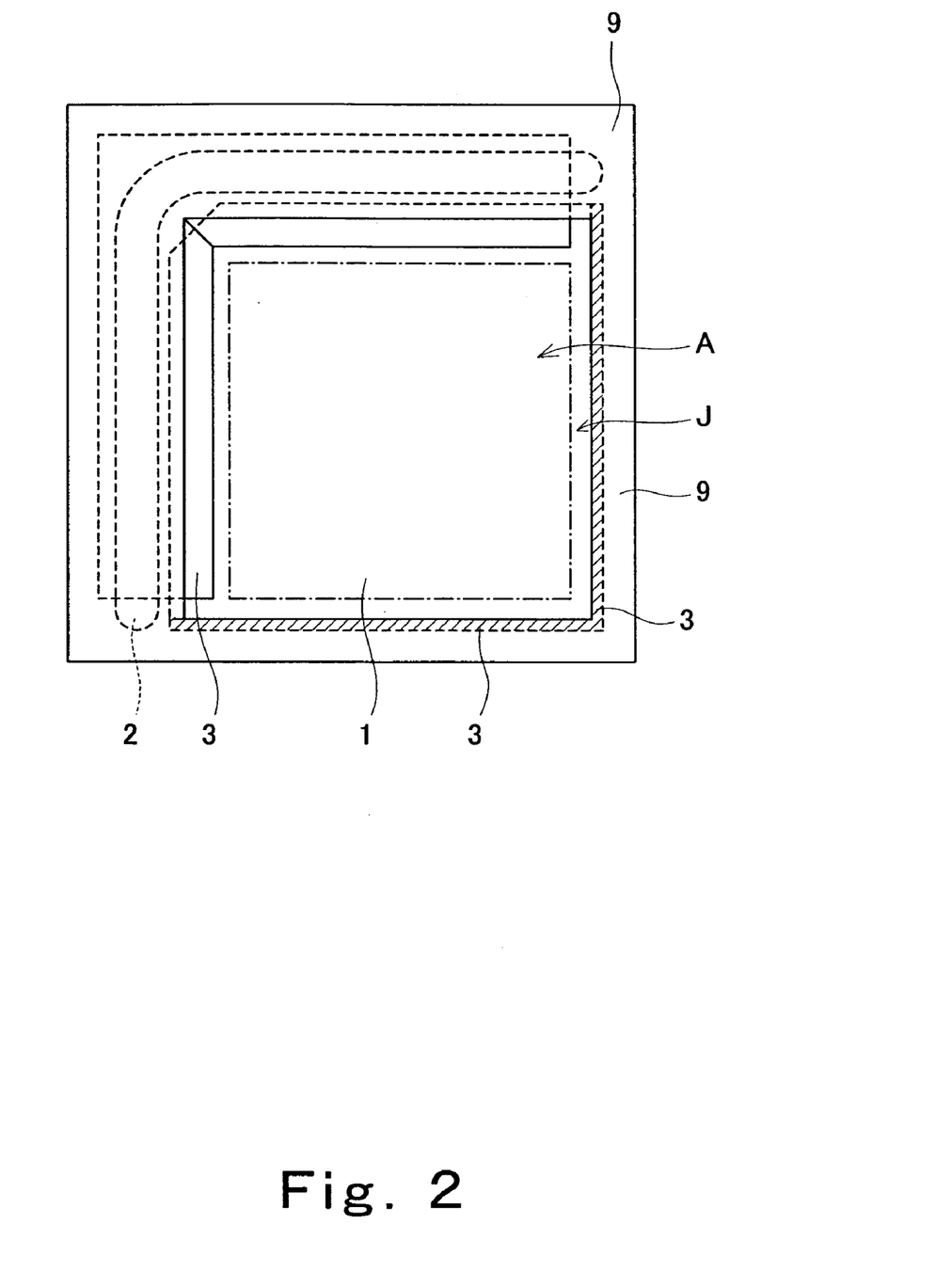
FIG. 2 is a perspective plan view schematically showing the structure of the lighting unit in FIG. 1.

FIG. 1 is a cross-sectional view schematically showing a structure of a lighting unit and a liquid crystal display device comprising the same according to a first embodiment of the present invention. FIG. 2 is a perspective plan view of the lighting unit in FIG. 1, in which a light correction sheet is omitted.

As shown in FIGS. 1 and 2, the lighting unit comprises a flat-plate shaped transparent light guiding plate 1 configured to transmit light, an L-shaped fluorescent discharge tube 2 provided along an end face E1 of the light guiding plate 1, as a light source, a reflecting sheet 3 which covers the end face E1 of the light guiding plate 1 and the fluorescent discharge tube 2, an end face E2 of the light guiding plate 1 on which the fluorescent discharge tube 2 is not provided, and a bottom surface of the light guiding plate 1, a light correction sheet 4 provided on a light emanating surface side of the light guiding plate 1, and a casing 9 for holding these components.

The light guiding plate 1 is made of a material having optical characteristics, such as transmissivity and a refractive index or the like required for transmitting light, for example, a material such as acrylic, which is optimal in the optical characteristic. A dot pattern or a groove pattern (not shown) for scattering light, which varies its shape according to a distance from the fluorescent discharge tube 2, is formed on a bottom surface of the light guiding plate 1.

The reflecting sheet 3 is made of a white and highly reflective material, and is comprised of an integral-type sheet that continuously covers the fluorescent discharge tube 2 and the end face E1 of the light guiding plate, the end face E2 of the light guiding plate 1, and the bottom surface of the light guiding plate 1. The reflecting sheet 3 is disposed so as to cover the bottom surface of the light guiding plate 1, and is bent in U-shape along a periphery of the fluorescent discharge tube 2 disposed on the end face E1 of the light guiding plate 1, and an end portion of the reflecting sheet 3 is bonded to a light emanating surface of the light guiding plate 1 by an adhesive tape 10 such as a double face adhesive tape. The reflecting sheet 3 is also bent along the end face E2 of the light guiding plate 1. By the reflecting sheet 3 thus covering the end faces E1 and E2 and the bottom surface of the light guiding plate 1, it becomes possible to guide a light emitted from the fluorescent discharge tube 2 into the light guiding plate 1 through the end face E1 thereof, and to return the light emanating outside from the end face E2 and the bottom surface of the light guiding plate 1 into the light guiding plate 1 by reflecting it. This increases the light (that is to say, an illumination light) emanating from the light emanating surface of the light guiding plate 1, thereby enabling the light to be used more efficiently. Although the integral-type reflecting sheet 3 is used herein, the reflecting sheet 3 may be structured by using separate sheets respectively covering the end face E1 of the light guiding plate 1 and the fluorescent discharge tube 2, the bottom surface of the light guiding plate 1, and the end face E2 of the light guiding plate 1. By using the integral-type reflecting sheet 3 as in this embodiment, a thin lighting unit, a cost reduction thereof, and a reduction of the number of assembly processes thereof are realized.

The light correction sheet 4 is provided on the light emanating surface side of the light guiding plate 1. Herein, a space 15 is formed between the light emanating surface of the light guiding plate 1 and the lower surface of the light correction sheet 4, and a spacing H of the space 15 is not larger than one pixel dimension of a crystal liquid cell used, for example, 0.4 mm or smaller. As the light correction sheet 4, a plurality of sheets of various specifications having the optical characteristic may be provided as necessary, and herein, two light correction sheets 4 are provided. For example, the light correction sheet 4 is constituted by a diffusion sheet, a prismatic sheet and the like. By thus providing the light correction sheet 4, it becomes possible to make the light emanating from the lighting unit uniform and highly luminous.

After assembling a lighting element 20 by thus disposing the fluorescent discharge tube 2, the light guiding plate 1, the reflecting sheet 3, and the light correction sheet 4, the lighting element 20 is stored in the casing 9. Thus, the lighting unit is formed. The casing 9 is frame-shaped, comprising an edge portion 9*a* and a side portion 9*b*, and is configured to support the lighting element 20 in a vertical direction by the edge portion 9*a* and in a horizontal direction by the side portion 9*b*.

The casing 9 disposed on the light emanating surface side of the lighting element 20 has an opening portion J. As described below, the opening portion J is sized so as not to interfere with a display rear surface side polarizer 13*a* of a liquid crystal panel 11 disposed on the lighting unit, that is, sized to be larger than the polarizer 13*a* and to be able to contain it. Furthermore, the opening portion J is sized to be smaller than a crystal liquid cell 111 comprising at least a pair of transparent substrates with a liquid crystal layer interposed therebetween, and to allow the cell 111 to be disposed on the edge portion 9*a*. By forming such opening portion J, a display region A is located within the opening portion J, and the edge portion 9*a* of the casing 9 encloses the display region A, in a plan view.

Herein, the casing 9 is made of an electrically conductive material, such as a steel plate. Therefore, it becomes possible to inhibit a noise from entering an electronic component such as the liquid crystal panel 11 due to an influence of an electromagnetic wave generated from the fluorescent discharge tube 2 or the like. Thus, the casing 9 can have a shield effect. A through-hole G which communicates with outside is provided on the side portion 9*b* of the casing 9, for a weight saving and an installation by a user. In the structure in which the lighting element 20 is held by the casing 9, a space (specifically, a clearance F) is formed between the light correction sheet 4 or the light guiding plate 1 and an inner wall of the side portion 9*b* of the casing 9. So, it becomes possible to absorb a dimension difference by the clearance F, when the light correction sheet 4, the light guiding plate 1, and the casing 9 expand with different expansion rates due to a temperature variation, thereby resulting in the dimension difference. As a result, it becomes possible to inhibit occurrence of distortion or the like.

Since the through-hole G is formed on the side portion 9*b* of the casing 9 as described above, dust enters the casing 9 from outside through the through-hole G. However, herein, the spacing H of the space between the light guiding plate 1 and the light correction sheet 4 is not larger than one pixel dimension, so that the dust larger than the spacing H of the dust which might enter the space through the clearance F, is inhibited from entering the space, and only the dust not larger than one pixel dimension (herein, not larger than 0.4 mm) enters the space. A defect brought about by such small dust is, though it varies depending on the liquid crystal cell 111 mounted, not larger than one pixel dimension, so that it does not have a large influence on a display image, unlike in a case where the defect arises over a plurality of pixels. Therefore, it becomes possible to inhibit occurrence of inferior display and a non-uniform luminance or the like. Also, by inhibiting entry of large dust in this manner, it becomes possible to inhibit damage to components such as the light correction sheet or the like due to a friction between the components and the dust.

The liquid crystal panel 11 comprising the display rear surface side polarizer 13*a*, the liquid crystal cell 111, and the display front surface side polarizer 13*b*, is provided on the lighting unit thus structured, and a frame-shaped front cover 12 for holding these components is attached. Thus, the liquid crystal display device is formed. Herein, a transparent-type liquid crystal display device comprising a transparent-type liquid crystal panel 11 is described.

In this embodiment, unlike in a conventional structure (see FIG. 4) in which the display rear surface side polarizer 13*a* is disposed on the edge portion 9*a* of the casing 9, the display rear surface side polarizer 13*a* is directly disposed on the front surface of the light correction sheet 4 exposed in the opening portion J formed on the casing 9. By thus disposing the polarizer 13*a* directly on the light correction sheet 4, a structure in which little space is formed between the light correction sheet 4 and the polarizer 13*a* can be realized. Since the opening portion J is smaller than the liquid crystal cell 111, a portion of the liquid crystal cell 111 disposed on the polarizer 13*a*, which overlaps with the edge portion 9*a* of the casing 9, is bonded to the edge portion 9*a* by an adhesive tape 14 such as a double face adhesive tape. The space is formed between the light emanating surface of the light guiding plate 1 and a lower surface of the light correction sheet 4. Although this space is shown exaggeratedly in the drawings, the spacing H of the space is as small as not larger than one pixel dimension as described above, so that the space hardly affects deflection of the liquid crystal cell 111.

In the structure in which the little space is formed between the light correction sheet 4 and the display rear surface side polarizer 13*a*, the liquid crystal cell 111 is supported by a front surface of the flat display rear surface side polarizer 13*a*, if the display device is pushed from the display surface side of the liquid crystal cell 111. To be precise, the display rear surface side polarizer 13*a* is supported by the light correction sheet 4, and the light correction sheet 4 receives a pressure from the liquid crystal cell 111 side through the display rear surface side polarizer 13*a* and is supported by the light emanating surface of the light guiding plate 1 such that it deflects as much as the spacing H between the light emanating surface of the light guiding plate 1 and itself. Since the spacing H is very small as described above, deflection amount of the light correction sheet 4 is negligibly small as compared to allowable deflection amount of the liquid crystal cell 111. Therefore, the display rear surface side polarizer 13a is substantially supported by the light emanating surface of the light guiding plate 1. In the above structure, since the liquid crystal cell 111 and the like do not deflect substantially, it becomes possible to inhibit break of the liquid crystal cell 111 comprising glass substrates or the like. Especially, when a thickness of the edge portion 9a of the casing 9 is set substantially equal to that of the display rear surface side polarizer 13a, an upper surface of the edge portion 9a and an upper surface of the display rear surface side polarizer 13a are substantially coplanar with each other. So, when a user accidentally pushes the liquid crystal cell 111 from the display surface side thereof, the liquid crystal cell 111 uniformly contacts these flat surfaces, and the entire cell 111 is uniformly supported. Therefore, deflection of the liquid crystal cell 111 and break of the same are inhibited. In addition, when the casing 9 is made of the steel plate as described above, the edge portion 9a can be formed to be equal in thickness to the thin display rear surface side polarizer 13a, and it becomes possible for the casing 9 to perform a function of holding the lighting element 20 by maintaining a strength or the like thereof regardless of the thin edge portion 9a. And, it becomes possible to inhibit a noise from entering the electronic component of the liquid crystal display device due to the influence of the electromagnetic wave generated from the fluorescent discharge tube 2 or the like.

As described above, in the lighting unit and the liquid crystal display device comprising the same in this embodiment, it is possible to inhibit the break of the liquid crystal cell due to the pressure from the panel side, and to inhibit the entry of the dust having influence on a display. So, it is possible to obtain a liquid crystal display device that can be used in products of various uses, including portable device used in severe surroundings such as outside. Such a liquid crystal display is highly reliable and stable, and provides a satisfactory display.

Figure 3:
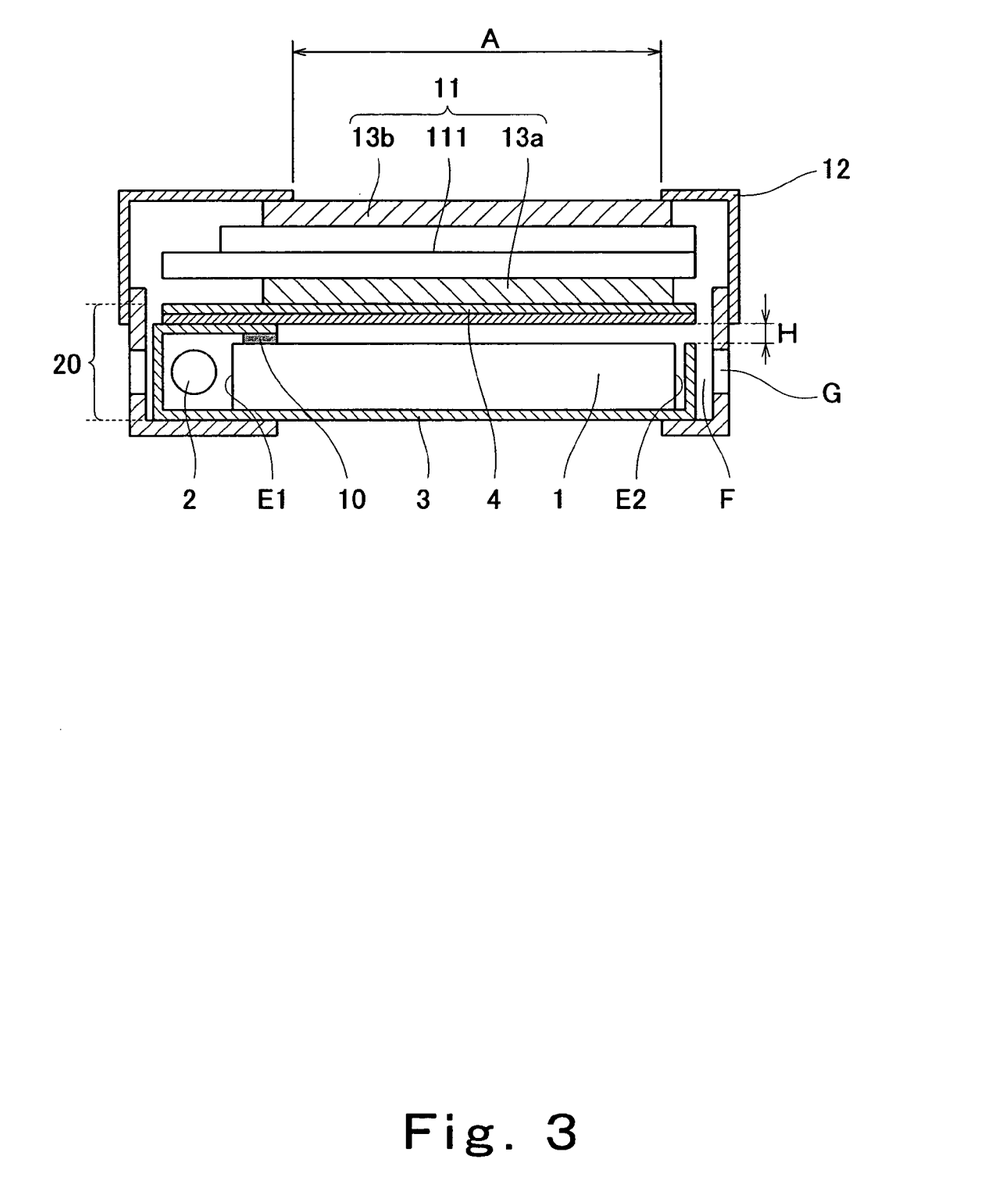
FIG. 3 is a cross-sectional view schematically showing a structure of a lighting unit and a liquid crystal display device comprising the same according to another embodiment of the present invention.

FIG. 3 is a cross-sectional view schematically showing a structure of the lighting unit and the liquid crystal display device comprising the same according to another embodiment of the present invention.

As shown in FIG. 3, the lighting unit of this embodiment is identical in structure to the lighting unit of the above-described embodiment except the following point. Specifically, in this embodiment, the edge portion 9a of the casing 9 is not formed on the light emanating surface side, so that the display region A is not enclosed by the casing 9 and is entirely opened. In this embodiment thus structured, as in the above-described embodiment, since the display rear surface side polarizer 13a is disposed directly on the light correction sheet 4, the same effect as described above can be obtained. In the structure in which the edge portion 9a of the casing 9 encloses the display region A, as in the above-described embodiment, since the liquid crystal cell 111 is disposed on the edge portion 9a, positioning of the liquid crystal cell 111 becomes easier, and the liquid crystal cell 111 can be bonded to and fixed to the casing 9. And, with only the lighting unit provided, since the edge portion 9a of the casing 9 holds the lighting element 20 on the light emanating surface side, it is possible to advantageously inhibit the lighting element 20 contained in the casing 9 from getting detached.

While the L-shaped fluorescent discharge tube 2 is used in the above-described embodiment, a U-shaped fluorescent discharge tube 2 may be used in place of the L-shaped one, a light source other than the fluorescent discharge tube may be used, too. Furthermore, while the lighting unit of the edge light type is described in this embodiment, the present invention is applicable to the lighting unit of other types.

In addition, the transparent-type liquid crystal cell 111 is described in this embodiment, the same effect will be obtained when the present invention is applied to a semi-transparent-type liquid crystal display device comprising a semitransparent-type liquid crystal cell 111.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention.

INDUSTRIAL APPLICABILITY

A lighting unit according to the present invention is useful as a lighting unit in a liquid crystal display device used in a portable phone, a personal computer and the like. And, the liquid crystal display device according to the present invention comprising the lighting unit is useful as a display device of the portable phone, the personal computer, or the like, especially as the display device which is required to be thin and light.

The invention claimed is:
1. A liquid crystal display device comprising:
   a lighting unit including:
      a light source;
      a light guiding component for guiding light emitted from the light source and emanating the light from a light emanating surface to an object to be illuminated;
      a reflecting component covering at least a bottom surface of the light guiding component;
      a light correction component disposed on the light emanating surface of the light guiding component; and
      a casing for holding the light source, the light guiding component covered with the reflecting component, and the light correction component, wherein
      the casing has an opening portion in a region corresponding to a light emanating region of the light correction component,
      the object to be illuminated is disposed in direct contact with an upper surface of the light correction component within the opening portion, and
      a space is formed between the light guiding component and the light correction component, and
   a liquid crystal panel as an object to be illuminated disposed on a light emanating surface side of the lighting unit, the liquid crystal panel having a liquid crystal cell comprising a pair of transparent substrates with a liquid crystal layer interposed therebetween, wherein
   the liquid crystal panel is disposed in direct contact with a front surface of the light correction component within the opening portion of the casing of the lighting unit;
   the liquid crystal panel comprises a pair of polarizers with the liquid crystal cell interposed therebetween;

a polarizer on the lighting unit side of the pair of polarizers has an outer diameter smaller than an outer diameter of the opening portion of the casing, and directly contacts a front surface of the light correction component within the opening portion;

the casing has a frame-shaped edge portion protruding toward the opening portion so as to enclose the opening portion; and the liquid crystal cell is disposed on an upper surface of the edge portion.

2. The liquid crystal display device according to claim 1, wherein a thickness of the edge portion of the casing is substantially equal to a thickness of the polarizer on the lighting unit side.

3. The liquid crystal display device according to claim 1, wherein the casing is made of an electrically conductive material.

4. The liquid crystal display device according to claim 1, wherein a spacing of said space formed between the light guiding component and the light correction component in the lighting unit is not larger than a dimension of each of pixels composing the liquid crystal cell.

5. The liquid crystal display device according to claim 4, wherein the spacing of the space is 0.4 mm or smaller.

6. The liquid crystal display device according to claim 4, wherein the casing has a through-hole to allow an outside of the casing and an inside of the casing to communicate with each other.

7. The liquid crystal display device according to claim 1, wherein the light guiding component is a light guiding plate;

the light source is disposed along a first end face of the light guiding plate;

the reflecting component is a reflecting sheet;

a bottom surface of the light guiding plate, the first end face of the light guiding plate and the light source, and a second end face of the light guiding plate on which the light source is not disposed are covered with the reflecting sheet;

the light correction component comprises one or a plurality of light correction sheets; and the casing is frame-shaped and supports at least the bottom surface of the light guiding plate, the second end face of the light guiding plate, and the first end face of the light guiding plate and the light source, each of which is covered with the reflecting sheet.

8. A liquid crystal display device comprising:

a lighting unit comprising:
 a light source;
 a light guiding component for guiding light emitted from the light source and emanating the light from a light emanating surface to an object to be illuminated;
 a reflecting component covering at least a bottom surface of the light guiding component;
 a light correction component disposed on the light emanating surface of the light guiding component; and
 a casing for holding the light source, the light guiding component covered with the reflecting component, and the light correction component, wherein the casing has an opening portion in a region corresponding to a light emanating region of the light correction component, and the object to be illuminated is disposed in direct contact with an upper surface of the light correction component within the opening portion; and a liquid crystal panel as an object to be illuminated disposed on a light emanating surface side of the lighting unit, the liquid crystal panel having a liquid crystal cell comprising a pair of transparent substrates with a liquid crystal layer interposed therebetween, wherein the liquid crystal panel is disposed in direct contact with a front surface of the light correction component within the opening portion of the casing of the lighting unit, the liquid crystal panel comprises a pair of polarizers with the liquid crystal cell interposed therebetween, a polarizer on the lighting unit side of the pair of polarizers has an outer diameter smaller than an outer diameter of the opening portion of the casing, and directly contacts a front surface of the light correction component within the opening portion, the casing has a frame-shaped edge portion protruding toward the opening portion so as to enclose the opening portion, the liquid crystal cell is disposed on an upper surface of the edge portion, and a thickness of the edge portion of the casing is substantially equal to a thickness of the polarizer on the lighting unit side.

9. A liquid crystal display device comprising:

a lighting unit comprising:
a light source;
a light guiding component for guiding light emitted from the light source and emanating the light from a light emanating surface to an object to be illuminated;
a reflecting component covering at least a bottom surface of the light guiding component;
a light correction component disposed on the light emanating surface of the light guiding component; and
a casing for holding the light source, the light guiding component covered with the reflecting component, and the light correction component, wherein the casing has an opening portion in a region corresponding to a light emanating region of the light correction component, and the object to be illuminated is disposed in direct contact with an upper surface of the light correction component within the opening portion; and a liquid crystal panel as an object to be illuminated disposed on a light emanating surface side of the lighting unit, the liquid crystal panel having a liquid crystal cell comprising a pair of transparent substrates with a liquid crystal layer interposed therebetween, wherein the liquid crystal panel is disposed in direct contact with a front surface of the light correction component within the opening portion of the casing of the lighting unit, and the casing is made of an electrically conductive material.

10. A liquid crystal display device comprising:

a lighting unit comprising:
a light source;
a light guiding component for guiding light emitted from the light source and emanating the light from a light emanating surface to an object to be illuminated;

a reflecting component covering at least a bottom surface of the light guiding component;

a light correction component disposed on the light emanating surface of the light guiding component; and a casing for holding the light source, the light guiding component covered with the reflecting component, and the light correction component, wherein the casing has an opening portion in a region corresponding to a light emanating region of the light correction component, and the object to be illuminated is disposed in direct contact with an upper surface of the light correction component within the opening portion; and a liquid crystal panel as an object to be illuminated disposed on a light emanating surface side of the lighting unit, the liquid crystal panel having a liquid crystal cell comprising a pair of transparent substrates with a liquid crystal layer interposed therebetween, wherein the liquid crystal panel is disposed in direct contact with a front surface of the light correction component within the opening portion of the casing of the lighting unit, and a spacing of a space formed between the light guiding component and the light correction component in the lighting unit is not larger than a dimension of each of pixels composing the liquid crystal cell.

11. The liquid crystal display device according to claim 10, wherein the spacing of the space is 0.4 mm or smaller.

12. The liquid crystal display device according to claim 10, wherein the casing has a through-hole to allow an outside of the casing and an inside of the casing to communicate with each other.

13. A liquid crystal display device comprising:

a lighting unit comprising:

a light source;

a light guiding component for guiding light emitted from the light source and emanating the light from a light emanating surface to an object to be illuminated;

a reflecting component covering at least a bottom surface of the light guiding component;

a light correction component disposed on the light emanating surface of the light guiding component; and a casing for holding the light source, the light guiding component covered with the reflecting component, and the light correction component, wherein the casing has an opening portion in a region corresponding to a light emanating region of the light correction component, and the object to be illuminated is disposed in direct contact with an upper surface of the light correction component within the opening portion; and a liquid crystal panel as an object to be illuminated disposed on a light emanating surface side of the lighting unit, the liquid crystal panel having a liquid crystal cell comprising a pair of transparent substrates with a liquid crystal layer interposed therebetween, wherein the liquid crystal panel is disposed in direct contact with a front surface of the light correction component within the opening portion of the casing of the lighting unit, and the light guiding component is a light guiding plate;

the light source is disposed along a first end face of the light guiding plate;

the reflecting component is a reflecting sheet;

a bottom surface of the light guiding plate, the first end face of the light guiding plate and the light source, and a second end face of the light guiding plate on which the light source is not disposed are covered with the reflecting sheet;

the light correction component comprises one or a plurality of light correction sheets; and the casing is frame-shaped and supports at least the bottom surface of the light guiding plate, the second end face of the light guiding plate, and the first end face of the light guiding plate and the light source, each of which is covered with the reflecting sheet.

* * * * *